(12) United States Patent
Ehrmann et al.

(10) Patent No.: US 11,319,100 B2
(45) Date of Patent: May 3, 2022

(54) SELF-CONTROLLING PACKAGING MACHINE AND METHOD FOR SAME

(71) Applicant: MULTIVAC SEPP HAGGENMÜLLER SE & CO. KG, Wolfertschwenden (DE)

(72) Inventors: Elmar Ehrmann, Bad Grönenbach (DE); Claus Botzenhardt, Kempten (DE)

(73) Assignee: Multivac Sepp Haggenmüller SE & Co. KG, Wolfertschwenden (DE)

( * ) Notice: Subject to any disclaimer, the term of this patent is extended or adjusted under 35 U.S.C. 154(b) by 162 days.

(21) Appl. No.: 15/750,186

(22) PCT Filed: Aug. 8, 2016

(86) PCT No.: PCT/EP2016/068880
§ 371 (c)(1),
(2) Date: Feb. 3, 2018

(87) PCT Pub. No.: WO2017/021554
PCT Pub. Date: Feb. 9, 2017

(65) Prior Publication Data
US 2018/0273225 A1   Sep. 27, 2018

(30) Foreign Application Priority Data

Aug. 6, 2015   (DE) ...................... 10 2015 214 992.7

(51) Int. Cl.
*B65B 57/00*   (2006.01)
*B29C 51/46*   (2006.01)
(Continued)

(52) U.S. Cl.
CPC .............. *B65B 57/00* (2013.01); *B29C 51/46* (2013.01); *B29C 65/18* (2013.01);
(Continued)

(58) Field of Classification Search
CPC ......... B65B 57/00; B65B 9/04; B65B 31/022; B65B 47/02; B65B 51/10; B65B 51/14;
(Continued)

(56) References Cited

U.S. PATENT DOCUMENTS 3,818,232 A * 6/1974 Kirkpatrick ........... G01F 23/288
378/52
4,172,347 A * 10/1979 Nitz ....................... B65B 57/02
53/52

(Continued)

FOREIGN PATENT DOCUMENTS

CN   101241339 A   8/2008
CN   201566855 U   9/2010
(Continued)

OTHER PUBLICATIONS

Moser, A., 2013 "Use of process knowledge in the thermoforming of packaging", PhD thesis, University of Duisburg-Essen, Duisburg, pp. 1-135.

Primary Examiner — Sameh Tawfik
(74) Attorney, Agent, or Firm — Husch Blackwell LLP

(57) ABSTRACT

A packaging machine comprising a control unit, a plurality of measuring devices and a plurality of working units for different process. The control unit is functionally connected to the working units and to the measuring devices. The measuring devices may detect actual process values at the respective working units and forwarding these values to the control unit for monitoring the respective working units. The control unit may create a specific program sequence for each of the individual working units and/or a program sequence coordinated with respect to the working units, by comparing the actual process values from the respective measuring devices with associated target process values from a memory. The individual working units may function according to this program sequence, depending on the actual (Continued)

process values detected at these working units, and/or the working units are coordinated with one another based on the actual process values.

17 Claims, 10 Drawing Sheets

(51) Int. Cl.
| | |
|---|---|
| B65B 47/02 | (2006.01) |
| B65B 9/04 | (2006.01) |
| B29C 65/18 | (2006.01) |
| B29C 65/00 | (2006.01) |
| B65B 31/02 | (2006.01) |
| B65B 51/10 | (2006.01) |
| G05B 19/042 | (2006.01) |
| B65B 51/14 | (2006.01) |
| B29L 31/00 | (2006.01) |

(52) U.S. Cl.
CPC ...... *B29C 66/00145* (2013.01); *B29C 66/112* (2013.01); *B29C 66/131* (2013.01); *B29C 66/53461* (2013.01); *B29C 66/81455* (2013.01); *B29C 66/82421* (2013.01); *B29C 66/83221* (2013.01); *B29C 66/849* (2013.01); *B29C 66/9121* (2013.01); *B29C 66/9141* (2013.01); *B29C 66/924* (2013.01); *B29C 66/9221* (2013.01); *B29C 66/9231* (2013.01); *B29C 66/92443* (2013.01); *B29C 66/92921* (2013.01); *B29C 66/944* (2013.01); *B29C 66/953* (2013.01); *B65B 9/04* (2013.01); *B65B 31/022* (2013.01); *B65B 47/02* (2013.01); *B65B 51/10* (2013.01); *G05B 19/0426* (2013.01); *B29L 2031/712* (2013.01); *B65B 51/14* (2013.01); *B65B 2051/105* (2013.01); *G05B 2219/23012* (2013.01); *G05B 2219/45048* (2013.01)

(58) Field of Classification Search
CPC ... B65B 2051/105; B29C 65/18; B29C 51/46; B29C 66/00145; B29C 66/112; B29C 66/131; G05B 19/0426; G05B 2219/23012; G05B 2219/45048; B29L 2031/712
USPC ........................................................ 53/396
See application file for complete search history.

(56) References Cited

U.S. PATENT DOCUMENTS

| | | | | |
|---|---|---|---|---|
| 4,209,957 A * | 7/1980 | Utzmann | ................ | B29C 51/18 264/101 |
| 4,408,295 A * | 10/1983 | Kavage | ................... | B07C 5/365 250/208.4 |
| 4,691,496 A | 9/1987 | Anderson et al. | | |
| 4,894,977 A * | 1/1990 | Rittinger | ................ | B65B 47/02 53/453 |
| 4,962,840 A * | 10/1990 | Miura | ....................... | A24C 5/35 131/283 |
| 5,070,995 A * | 12/1991 | Schaffer | ................. | B65G 43/10 198/460.1 |
| 5,071,667 A * | 12/1991 | Grune | ..................... | B65B 31/00 426/396 |
| 5,715,645 A * | 2/1998 | Fukuda | .................. | B29C 65/18 53/374.6 |
| 5,715,654 A * | 2/1998 | Taylor | ................... | B29B 13/022 264/255 |
| 5,971,905 A | 10/1999 | Fukuda | | |
| 6,056,109 A | 5/2000 | Hidai et al. | | |
| 6,516,811 B1 * | 2/2003 | Focke | ..................... | B65B 19/28 131/283 |
| 8,381,494 B2 * | 2/2013 | Krakers | .................. | B65B 55/04 53/167 |
| 8,397,475 B2 * | 3/2013 | Boekstegers | .......... | B65D 79/02 53/507 |
| 8,615,973 B2 * | 12/2013 | Mondry | .................... | B65B 9/04 53/432 |
| 8,663,080 B2 * | 3/2014 | Bartoli | .................... | B65B 9/042 493/52 |
| 8,752,357 B2 * | 6/2014 | Schiche | ................ | B65B 61/065 493/82 |
| 9,884,446 B2 * | 2/2018 | Bartoli | .................... | B29C 51/46 |
| 10,399,714 B2 * | 9/2019 | Rizzieri | .................. | B65B 3/022 |
| 10,489,263 B2 * | 11/2019 | Grimm | ................... | B65B 57/00 |
| 2002/0051833 A1 | 5/2002 | Shiozaki | | |
| 2003/0105545 A1 | 6/2003 | Iwasaki et al. | | |
| 2005/0039420 A1 | 2/2005 | Albritton et al. | | |
| 2007/0151209 A1 * | 7/2007 | Trpkovski | ............ | G01N 21/251 53/403 |
| 2008/0152767 A1 * | 6/2008 | Maisel | ...................... | B65B 9/04 426/118 |
| 2009/0071100 A1 * | 3/2009 | Ehrmann | .................. | B65B 9/04 53/84 |
| 2010/0242416 A1 | 9/2010 | Sato et al. | | |
| 2011/0061344 A1 * | 3/2011 | Ehrmann | .............. | B29C 51/422 53/453 |
| 2013/0152507 A1 | 6/2013 | Frazier et al. | | |
| 2014/0109511 A1 | 4/2014 | Hammad | | |
| 2014/0249007 A1 * | 9/2014 | Ehrmann | ................ | B65B 41/14 493/102 |
| 2015/0096263 A1 * | 4/2015 | Ehrmann | ................. | B65B 9/04 53/411 |
| 2017/0305586 A1 | 10/2017 | Rizzi et al. | | |
| 2018/0222619 A1 * | 8/2018 | Ehrmann | ................ | B29C 51/46 |

FOREIGN PATENT DOCUMENTS

| | | |
|---|---|---|
| CN | 102372100 A | 3/2012 |
| CN | 103930349 A | 7/2014 |
| CN | 203845103 U | 9/2014 |
| CN | 104554910 A | 4/2015 |
| DE | 7345840 U | 11/1977 |
| DE | 3739432 A1 | 6/1989 |
| DE | 19735942 A1 | 3/1999 |
| DE | 102005059312 A1 | 6/2007 |
| DE | 102006040807 A1 | 3/2008 |
| DE | 102006050417 A1 | 4/2008 |
| DE | 102008024461 A1 | 12/2009 |
| DE | 102009017638 A1 | 10/2010 |
| DE | 102009040977 A1 | 3/2011 |
| DE | 202010017361 U1 | 12/2011 |
| DE | 102012004341 A1 | 9/2013 |
| DE | 102012005179 A1 | 9/2013 |
| DE | 102012005912 A1 | 9/2013 |
| DE | 102013105548 A1 | 12/2014 |
| EP | 1225491 A1 | 7/2002 |
| EP | 1316002 A1 | 6/2003 |
| EP | 1462894 A2 | 9/2004 |
| EP | 1710074 A1 | 10/2006 |
| EP | 1818159 A2 | 8/2007 |
| EP | 1935787 A1 | 6/2008 |
| EP | 2241862 A2 | 10/2010 |
| EP | 2252921 A1 | 11/2010 |
| EP | 2415677 A1 | 2/2012 |
| EP | 2690023 A1 | 1/2014 |
| EP | 2722279 A1 | 4/2014 |
| JP | 04138504 A | 5/1992 |
| WO | 0019278 A1 | 4/2000 |
| WO | 2009109178 A1 | 9/2009 |

\* cited by examiner

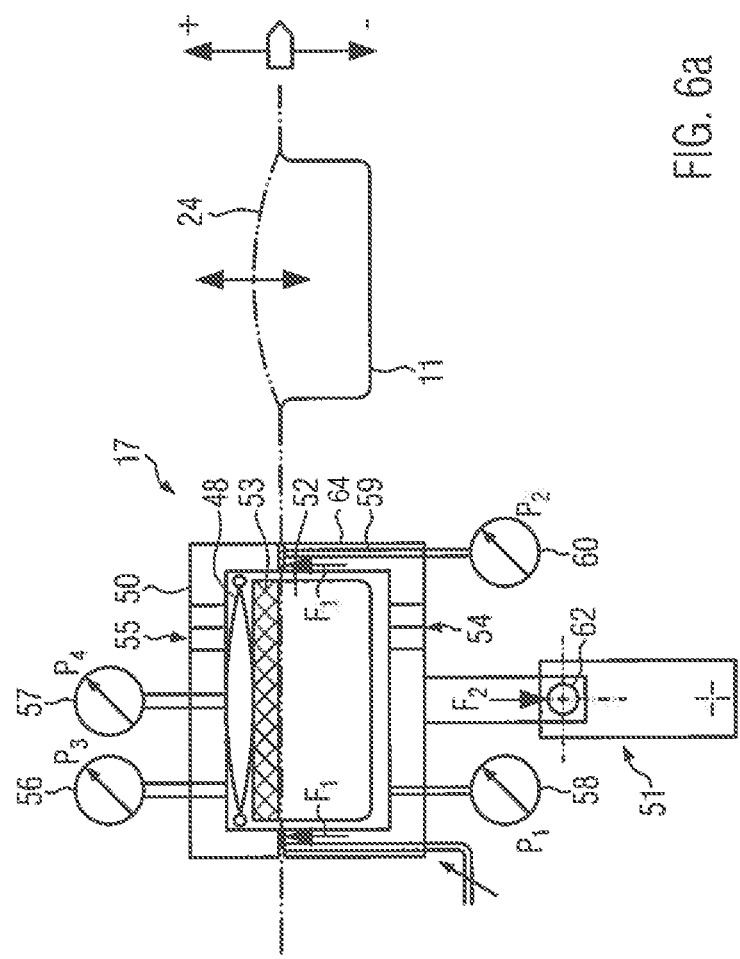

SELF-CONTROLLING PACKAGING MACHINE AND METHOD FOR SAME

FIELD OF THE INVENTION

The present invention relates to a self-controlling packaging machine and a method of using a self-controlling packaging machine.

BACKGROUND OF THE INVENTION

In known packaging machines, the production process comprises a large number of individual processes, such as closing the chamber, heating, molding, evacuating, gas-flushing, sealing, opening the chamber and safety periods for allowing sufficient venting of the chambers.

The individual processes are here time-controlled, said individual processes taking place in succession, according to requirements such that they overlap for a certain period of time or are separated from one another by safety time intervals. The process times in question depend in particular on a chamber volume, types of films/foils, sequences of motions and switching times of valves of the packaging machine, and must therefore be preset at the operating panel of the packaging machine in a complicated manner by the machine operators for each machine equipment as well as for each product to be produced.

The setting of the respective process times of the packaging machine as well as the coordination of the individual process times with one another require a very profound knowledge of the individual processes on the part of the machine operator, and even with very experienced machine operators it may happen that several test runs for the packaging machine are required so as to achieve respective process times that are smoothly coordinated with one another.

In many cases, however, the setting of process times of the packaging machine results in time delays leading to a substantial reduction of the packaging machine performance.

A known molding station is shown in FIG. 7a. This molding station comprises an upper part and a lower part that is vertically adjustable by means of a lifting mechanism. Between the upper part and the lower part, a molding chamber has provided therein a heating plate used for heating a film section to be molded. In addition, the upper part and the lower part have provided therein pressure and vent valves, on the one hand for pressing the film section first against the heating plate and, on the other hand, for allowing pressure molding of a packaging trough M. These processes are time-controlled according to a preset time schedule.

The time-controlled valve switching is illustrated in FIG. 74B. In section AA, the main processes opening/closing the lifting mechanism, heating and molding are shown. Therebelow, in section BB, preset process times are shown, which the operator sets in the packaging machine. In section CC, the vent and pressure valve positions for the upper part and the lower part of the molding station are shown. In section DD, the respective pressure profiles in the upper part and in the lower part are shown.

After the molding station has been closed (step A'), pressure is generated in the lower part (step B'). The pressure build-up is time-controlled (step C') and discontinues or finishes as soon as the predetermined time has expired. Also a preset heating time of the heating plate runs down (step D'). When the heating time has expired, the vent valve in the lower part opens (step E') and pressure is built up in the upper part so as to mold the heated film section (step F'). The pressure build-up as well as a stabilization time preset for molding are controlled on a time basis (steps G' and H'). As soon as the stabilization time has expired, the upper vent opens (step I'). Now, a preset safety period additionally runs down at the end of the molding process (step J') before the molding station opens (step K').

The processes opening/closing of the lifting mechanism are position-controlled and heating and molding are time-controlled in the case of the upper molding station. Hence, the operator must input in the control unit a time control schedule for the molding station. Upon establishing the time control schedule, the operator approaches, on the basis of a plurality of tests, a desired packaging result. This kind of approach requires a high degree of experience and can only be accomplished by skilled personnel.

DE 10 2009 017 638 A1 discloses a packaging machine, where process times can be adapted by varying boundary conditions. The respective process times relate here especially to the number of products to be packed, which are made available.

EP 1 316 002 B1 discloses a machine tool whose sequence of operations is controllable on the basis of supplementary data from a database.

DE 10 2012 005 912 A1 discloses a method of checking the availability of the components used in a packaging line.

DE 10 2006 040 807 A1 discloses a sealing station for a packaging machine, wherein a force sensor is provided in the line of force of the sealing station, said force sensor allowing quality control in real time during the sealing process.

DE 10 2005 059 312 A1 discloses a packaging machine comprising a reader for reading machine-relevant information of an exchange part used in the packaging machine.

EP 1 710 074 A1 discloses a packaging machine comprising a tool provided with a sensor chip. Parameters of the tool read from the sensor chip can be used for setting the packaging machine.

DE 20 2010 017 361 U1 discloses a method which allows monitoring of the production process of a meat product.

WO 00/19278 A1 does not relate to packaging technology, but discloses a printing or copying system in the case of which the consumption of print cartridges is controlled and monitored.

DE 10 2008 024 461 A1 discloses a packaging machine comprising a processing station control unit connected to a central control unit of the packaging machine.

SUMMARY OF THE INVENTION

It is the object of the present invention to provide a packaging machine which can easily be set and operated by the machine operator and which additionally exhibits an improved performance. It is also the object to provide a method suitable for this purpose. In particular, the packaging machine as well as the method according to the present invention is intended to be controllable by inputting a small number of parameters and to be suitable for producing products of a very high quality in reduced clock cycles times.

Other than known time-controlled packaging machines, the packaging machine according to the present invention and the method for the same are process-controlled by means of an intelligent sensor system and control technique. The respective working processes are monitored by means of sensors and controlled depending on values detected by these sensors. In the case of the packaging machine according to the present invention, the program sequence of the working units used in said packaging machine is no longer primarily bound to process times preset by the operator, but is adapted, during operation, to the current production process, in particular to the measurable process progress of the respective working units. In this respect, it is primarily monitored how far actual process values have progressed with respect to predetermined or calculable target process values at the respective working units. Inflexible process times of the type which have manually been preset by the operator at the machine up to now are primarily no longer taken into consideration, since the respective processes at the working units will run until one or a plurality of target process values has been reached, i.e. the respective processes are sensor-controlled.

If at all, the present invention may use process times that can be retrieved automatically from a memory and generated on the basis of specific production parameters concerning the product, the tool and/or the packaging material. In the event of a change of tools and/or a change of products, the packaging machine can therefore rapidly be adjusted, without the operator having to spend a long time resetting the packaging machine. It follows that, according to the present invention, the packaging machine itself will adapt its operation in the best possible way.

To this end, the packaging machine according to the present invention may comprise a control unit, a plurality of measuring devices as well as a plurality of working units for different processes, the control unit being functionally connected to the working units as well as to the measuring devices. The measuring devices are configured for detecting actual process values at the respective working units and for forwarding these values to the control unit so as to monitor a process status at the respective working units. The control unit is configured for creating in a self-controlled manner a specific program sequence for each of the individual working units and/or a program sequence coordinated with respect to the working units, by comparing the actual process values forwarded to the control unit from the respective measuring devices with associated target process values, in particular an associated range of target process values, from a memory connected to the control unit. The individual working units can then function depending on the actual process values detected at these working units, and/or such that they are coordinated with one another as regards these values.

Self-controlling in the sense of the present invention means that the program sequence at a working unit does not take place in accordance with a preset process time. Instead, the program sequence at a working unit adapts itself with respect to the actual process values detected thereat, i.e. it is sensor-controlled. According to the present invention, the control unit operates as a functional link between the measuring devices and the working units. The detected actual process values are here forwarded by the measuring devices to the control unit, which, with respect to the actual process values, controls the respective program sequences for the individual working units themselves and/or such that they are coordinated with one another.

In particular, a process at a working unit may start, when a functionally preceding working unit reaches at least one target process value. This allows in particular a good coordination of the sequence of the individual working units. According to the present invention, a functional link can be established between the individual working units, so that the respective working units will be able to operate in immediate succession.

In addition, the invention allows, by means of actual process value detection at the respective working units, an early start determination of individual working units. This is based on the fact that a certain reaction time, which is also referred to as dead time among those skilled in the art, is required for accessing the valves and/or for generating control signals. In order to reduce such dead times, the present invention allows, on the basis of actual process value detection, to start at least the sequence of operations of one working unit prematurely, i.e. a certain time before a target process value is reached. This leads to an overall saving of time, since the individual working processes will be better coordinated with one another as regards their sequence.

Hence, the packaging machine according to the present invention differs from the prior art essentially insofar as it is no longer operated in a time-controlled manner according to a preset inflexible program sequence, i.e. with specific process times for the respective working units. Instead, the packaging machine according to the present invention is able to adapt, by means of the sensor system and the control unit provided thereon, the respective processes of the working units in a production-precise fashion to the actual process values currently detected on these working units, independently of how long the process in question has already been carried out. The respective processes can thus be carried out optimally as regards economical aspects and may, if necessary, take place in a coordinated manner such that, on the whole, larger batch sizes can be produced within shorter cycle times. In addition, the same quality can be produced for all the products.

In contrast to the prior art, the performance of the packaging machine according to the present invention thus no longer depends on the setting skills of the machine operator, but on the technical abilities of the packaging machine itself, which allow the packaging machine to adapt itself to the production process, i.e. to the process values currently detected on the working units, in a self-controlled manner.

The packaging machine according to the present invention proved to be particularly advantageous for the starting phase of a production process, since a plurality of test runs for optimally setting the packaging machine will here no longer be necessary. Instead, the packaging machine according to the present invention allows, from the very beginning, an optimum production of the products to be produced, since the sequence of the respective processes on the working units can immediately be controlled by means of the control unit by feedback with respect to the actual process values detected at these working units.

Due to the fact that, according to the present invention, the packaging machine itself is configured for optimizing the processes carried out thereon, the output per cycle will be increased, whereby labor costs can be reduced.

Preferably, the packaging machine comprises at least one robot configured as a working unit. This robot is used in particular as a charging unit for charging packages to be filled. The operation of the robot can be adapted to the sequence of operations of other working units according to the present invention. In particular, accelerations carried out by the robot arm can be adapted with respect to the progress of other working units on the packaging machine.

According to an embodiment of the present invention, the packaging machine may be a thermo-form packaging machine, a tray sealer or a belted chamber machine. Due to the fact that in such packaging machines a plurality of working processes take place, especially in coordination with one another, the self-controlling feedback can, on the basis of the control unit of the packaging machine according to the present invention, be used in a manner leading to a particular increase in performance. These packaging machines will then be able to control their production process in a self-controlling and automatic fashion, without having to resort primarily to preset process working cycles. This will in particular also allow an enormous reduction of changeover times at such machines.

In the packaging machine according to the present invention, the memory connected to the control unit especially serves as a data reservoir from which the control unit is supplied with the target process values so as to perform, as quickly as possible after the detection of the actual process values, a feedback control of the respective working units related to these actual process values.

In particular, the memory may be configured as a database, preferably as a knowledge database, which is configured for deriving, with respect to the data of a product to be produced by means of the packaging machine, the target process values for the respective working units. Preferably, the product to be produced, especially a film specification, a certain type of tool and/or a food product to be packaged, can be retrieved via an input panel of the packaging machine. Based on this setting, a special dataset of target process values can be made available to the control unit for the production process by the memory, and in particular by the database comprised therein. This would have the advantage that, when production is started, the machine operator would only have to select on the input panel of the packaging machine the product to be produced, whereupon the packaging machine will take over the production process in a self-controlling manner.

A particularly versatile use of the database will be possible, when the database is configured as a component part of a database system, the database system additionally comprising a database management unit configured for a bidirectional exchange of data between the control unit and the database. The use of the database management unit allows not only to determine and/or read out from the database the relevant target process values, based on actual process values detected at the working units, but it additionally allows to carry out control functions, in particular starting from the control unit, at the database, so that, for example, datasets stored on the database can be corrected, adapted and/or replaced. It follows that the packaging machine according to the present invention could, for example, easily be adapted to a new product that has not been produced by the packaging machine up to that time. In one embodiment, updates of the datasets stored on the database could be transferred to the database via a VPN link, a wireless connection, (e.g. by means of RFID), or from an USB flash drive.

According to the present invention, the processes on the packaging machine are controlled especially by format, process and/or film-dependent information. Film-dependent items of information especially concern a thermoforming depth, a sealing seam width, a final vacuum during sealing, a number of packages, a package size and/or a molding depth. Process-dependent items of information are especially a specific molding pressure, a specific sealing pressure, a cutting time, maximum admissible early starting times for opening or closing a lifting mechanism and/or maximum admissible early starting times for feeding the film. Film-dependent items of information are in particular a certain type of film, a sealing layer, a film thickness, a sealing layer thickness, a cooling time (stabilization time) in the mold, an ideal heating time, an ideal sealing time, and an ideal heating temperature for molding and preheating and/or an ideal heating temperature for sealing. In particular, the control unit is configured to generate the target process values and/or the control signals, based on the format-, process- and/or film-dependent information. Preferably, the target process values are based on data of the product to be produced, indicating for the latter in particular a sealing area, a sealing pressure, a final vacuum, a certain type of film/foil and/or a film thickness or a film specification, such as the layer structure.

Preferably, information concerning the film specification can be stored on the database by means of a wireless connection. In particular, the information on the film material can be read out from an RFID tag, which is attached to the film, by means of an RFID reader provided on the packaging machine and can be stored on the database by said RFID reader.

For each product to be produced, a preselection of specific target process values is preferably provided, said target process values being available to the process-guided self-controlling function of the packaging machine during operation. The program sequences at the respective working units are therefore adaptable with respect to the predetermined target process values.

Preferably, the target process values indicate an optimum molding and/or sealing temperature, an optimum sealing and/or molding pressure, and/or for a working unit configured as a molding station at least a stabilization time. When the predetermined optimum target process value or values is/are reached, the control unit can decide when the process at a working unit can be finished and a subsequent process at the same working unit or at some other working unit can be started so as to control the production sequence with smooth transitions between the processes of the respective working units.

According to an embodiment variant, the memory is configured such that it is integrated in the control unit or is, alternatively, implemented as an external unit. If the memory is formed integrally with the control unit, the memory can be accessed directly via an operating panel of the packaging machine. This variant primarily allows updating, replacing, and/or supplementing by means of the operating panel datasets stored in the memory. In particular as an external unit, the memory may be functionally connected to a plurality of packaging machines, and the respective control units of the plurality of packaging machines may here be able to functionally access the memory configured as an external unit. This will make sense particularly in the event that a plurality of packaging machines work parallel to one another in a production hall, without it being absolutely necessary that each of the respective packaging machines is equipped with a memory of its own. It would also be imaginable that the plurality of packaging machines resort to different datasets of the memory. In this context it would be imaginable that different production processes take place at the packaging machines.

Preferably, the memory is functionally connectable to an external network, the memory being adapted to be updated and/or accessed via the external network. It would, for example, be imaginable that a machine operator transfers from his computer workstation datasets via the external network, into which his computer is functionally integrated, to the memory. It would also be imaginable that the external network is used by the packaging machine manufacturer for accessing the memory of the packaging machine, although the latter has already been integrated in the production at the food packer's firm. On the basis of this variant, arbitrary data can be read from the memory, e.g. error reports, operating conditions, production data and/or server data.

Preferably, the respective measuring devices comprise at least one force, pressure, position, temperature, infrared, ultrasonic, induction, laser and/or moisture sensor. The respective sensors are especially installed such that they are integral with the working units so as to detect as precisely as possible the actual process values existing at these working units. Preferably, the sensors used detect the respective actual process values continuously during the operation of the packaging machine, so that, when a target process value has been reached, the control unit will be able to react quickly for terminating the process, if necessary, and for starting a subsequent process.

Preferably, at least one of the working units comprises a movable lower part and an upper part, which enclose therebetween a molding chamber or a sealing chamber and which comprise each at least one pressure gauge. The latter can be used for monitoring the pressure profiles within the upper part and the lower part during the production process. The control unit can here carry out a control of pressure generation, depending on the pressure profiles. Likewise, the control unit may control other processes within the molding chamber or the sealing chamber, depending on the pressure profiles.

According to an embodiment, one of the working units is configured as a molding station comprising at least one heating plate. The heating plate serves to heat a film section guided into the molding station, so that said film section can easily be molded afterwards. It will be advantageous when a function of the heating plate is controllable on the basis of detected pressure values within the molding station, in particular when a heating time of the heating plate can be retrieved depending on a pressure level reached within the molding station.

According to a variant, the molding station comprises a heating chamber and a molding chamber, which are configured such that they are spaced apart. The heating chamber serves here as a preheating unit and comprises preferably a lower and an upper heating plate, between which a film section can be clamped in position. In order to produce a particularly strong clamping force, a pressure generator may be arranged above the upper heating plate, said pressure generator being in particular an inflatable membrane and being capable of pressing the upper heating plate downwards.

It is imaginable that one of the working units is configured as a sealing station. The latter may optionally be equipped with a gas-flashing unit so as to create the desired atmosphere for the product to be sealed.

Preferably, the actual process value is a pressure detected in the working unit, the control unit being configured for finishing or starting at least one working process at said working unit or at at least one other working unit, when the pressure detected has reached a predetermined pressure level. The working process may, for example, be a heating or cooling process taking place according to a heating or cooling time taken from the memory.

The present invention also relates to a method for self-control of a program sequence of a process at different working units of a packaging machine. According to said program sequence, one process and/or a plurality of functionally coordinated processes are carried out during the operation of the packaging machine at the respective working units, wherein actual process values are detected at the respective working units and forwarded to a control unit of the packaging machine, wherein the control unit compares the actual process values forwarded thereto with associated target process values and creates in a self-controlled manner, based on the result of this comparison, the respective program sequences for the individual working units and/or a program sequence coordinated with respect to the respective working units, and coordinates on the basis thereof the operation of the packaging machine.

It follows that the operation of the packaging machine depends on the actual process values detected at the respective working units. With due regard to target process values for the product to be produced, it is then possible to determine, based on the actual process values detected, by means of the control unit whether the respective process at a working unit may be continued or interrupted and whether a subsequent process may possibly be allowed to be started. Hence, the self-control of the packaging machine depends, on the one hand, on the sensor systems provided on the respective working units such that they are integral therewith and, on the other hand, on the feedback-type control function which takes into account target process values, the target process values being made available to the control unit in particular by a memory connected to the control unit.

Making use of the method according to the present invention, the respective program sequences of the processes carried out at the working units are adapted during operation with due regard to the actual process values measured at these working units. The sequence of processes is no longer time-controlled in an inflexible manner, but is self-controlled as a function of actual process values that have been measured and reached.

It follows that, in the case of the present invention, starting of the process at a working unit primarily depends on the nature of the actual process values measured at the process preceding in the production process and/or at at least one working unit running at least partially simultaneously. Preferably, the process at a working unit will start, when at a process of the working unit or of at least one other working unit preceding in the production process the detected actual process value or values correspond to the predetermined target process values. Of course, the respective processes may, under the aspect of time, also take place in an overlapping manner, so to speak parallel to one another or such that they are separated by a time interval. Hence, it may be that the process of a working unit will already be started, when one or a plurality of detected actual process values at the process preceding this working unit has/have not yet reached the target process values. This can especially result in an avoidance of dead times, whereby the clock cycle times can be reduced. In the case of processes which are spaced apart in time and which take place one after the other, it would be possible that, when the target process value at a process of a working unit is reached, the subsequent process will not be started until a predetermined time interval has elapsed.

It follows that the respective processes at the working units can be optimized individually with respect to their process sequence by means of sensor systems and feedback control, the respective optimized program sequences of the processes being also used for the purpose of optimizing the other processes of the method, so that the entire program sequence of the method of the packaging machine can be optimized depending on the respective processes relative to one another.

Other aspects and advantages of the present invention will be apparent from the following detailed description of the preferred embodiments and the accompanying drawing figures.

DESCRIPTION OF THE SEVERAL VIEWS OF THE DRAWING

In the accompanying drawings, which form a part of the specification and are to be read in conjunction therewith in which like reference numerals are used to indicate like or similar parts in the various views:

FIG. 4b is a process diagram for the molding station according to FIG. 4a;

FIG. 5b is a process diagram for the molding station according to FIG. 5a;

FIG. 6a is a section of another embodiment of a sealing station in accordance with the teachings of the present disclosure;

FIG. 6b is a process diagram for the sealing station according to FIG. 6a;

FIG. 7b is a time-controlled process diagram for the prior art molding station according to FIG. 7a.

DETAILED DESCRIPTION OF THE INVENTION

Figure 1:
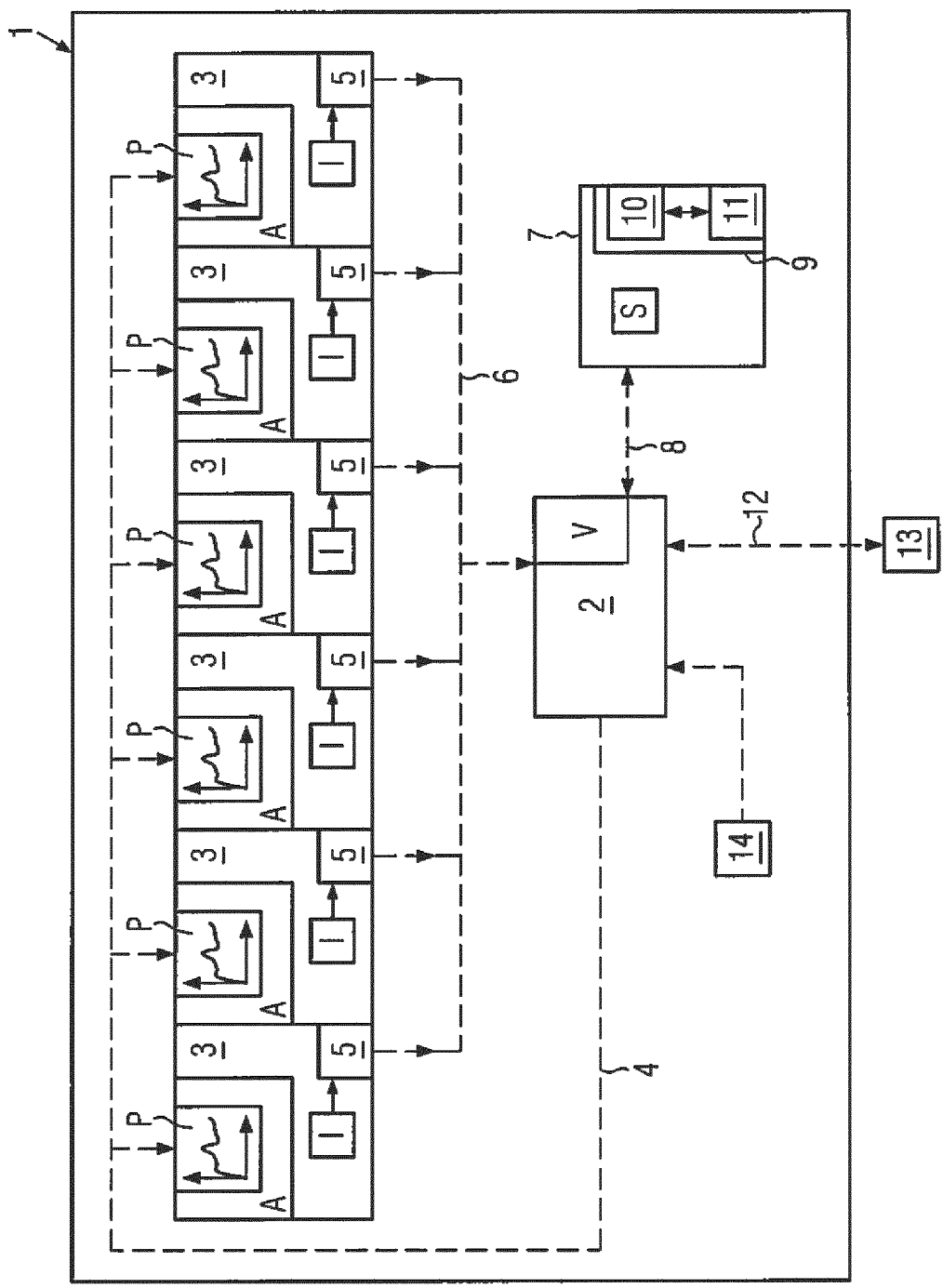
FIG. 1 is a schematic view of a packaging machine in accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows in a schematic representation a packaging machine 1 according to the present invention. For controlling the packaging process, the packaging machine 1 comprises a control unit 2. Furthermore, the packaging machine 1 comprises a plurality of working units 3, each connected to the control unit 2 by means of a functional connection 4. The working units 3 are working stations configured for different processes so as to produce the desired product.

During the production process, the respective working units 3 run in coordination with one another. The respective working units 3 may here operate in temporal succession and/or so to speak parallel to one another, i.e. in an overlapping fashion.

According to FIG. 1, the packaging machine 1 comprises a plurality of measuring devices 5, the respective measuring devices 5 being installed in the working units 3. The measuring devices 5 are configured for detecting actual process values I at the respective working units 3. Furthermore, FIG. 1 shows that the respective measuring devices 5 are connected to the control unit 2 via a further functional connection 6. Via the further functional connection 6, the measuring devices 5 can forward the detected actual process values I to the control unit 2. This allows the respective current process statuses of the working units 3 to be monitored during the production process by means of the measuring devices 5 used.

FIG. 1 also shows that the control unit 2 is connected to a memory 7. According to FIG. 1, the memory 7 is configured as part of the packaging machine 1, but it may just as well be connected to the control unit 2 of the packaging machine 1 as an external unit. The memory 7, which also comprises a database, is configured to provide target process values S. The target process values S depend in particular on specific data of the product to be produced. The target process values S may result, for example, from a film thickness, the type of film, a sealing area, a sealing pressure, a final vacuum to be evacuated and the product to be packed. Thus, different target process values S can be made available from the memory 7 for each product to be produced, which substantially consists of the product to be packed and of the package.

According to FIG. 1, the control unit 2 is able to access the target process values S of the memory 7 via a data link 8. In particular, the data link 8 is configured for bidirectional data traffic between the control unit 2 and the memory 7.

In addition, FIG. 1 shows that the control unit 2 is configured to create a program sequence P for the respective working units 3 by comparing V the actual process values I forwarded from the respective measuring devices 5 to the control unit 2 with the associated target process values S from the memory 7 connected to the control unit 2. The program sequence P of the respective working units 3 is provided for actuators A formed on the working units 3. The actuators A perform at the respective working units 3 a special type of work, e.g. conveying, forming and/or gas-flushing work, at the product to be produced.

On the basis of the detected actual process values I (for example, distance, pressure, vacuum, temperature, etc.) as well as the comparison of the latter with the target process values S from the memory 7, the control unit 2 according to the present invention initiates a functional feedback so as to co-ordinate in a self-controlled manner, according to the program sequence P created by the control unit, the actuators A provided on the respective working units 3. The control unit 2 is here configured for coordinating the respective program sequences P for the actuators A of the individual working units 3 and/or for controlling the respective program sequences P in a mutually coordinated and self-controlled manner, so as to guarantee a smooth and economical operating sequence of the packaging machine 1.

In particular, the control unit 2 may, according to one embodiment of the present invention, be configured for controlling the program sequence P of at least one working unit 3 depending on the progress of some other program sequence of at least one other working unit 3. In this respect, the control unit 2 may ensure that the program sequence P of at least one working unit 3 will be started when a predetermined actual process value I is detected at at least one other working unit 3. The respective program sequences P can thus be coordinated in a mutually well adapted manner, with their function depending on the respective actual process values detected at the working units 3 as well as on the functional feedback thereto. Hence, the packaging machine 1 according to the present invention is configured to coordinate in a self-controlled manner the respective program sequences executed thereon, said self-controlled coordination taking place especially in real time, without the necessity of setting on the packaging machine special values or operating sequences by a machine operator.

FIG. 1 additionally shows that the memory 7 comprises a database system 9, which is preferably equipped with a database 10 as well as with a database management unit 11. The database 10 may have stored therein specific datasets for the respective products to be produced, said datasets being in particular the respective target process values. Likewise, the database 10 may have stored therein specific product characteristics, which the database management unit 11 uses as a basis for deriving the target process values S.

FIG. 1 also shows that the control unit 2 may be functionally connected to an external network 13 via a wireless data link 12. The external network 13 may be a computer network from which the control unit 2 can be accessed. Furthermore, the control unit 2 may be configured such that it can be accessed from the external network 13 and such that, on the basis of such accessing, it will be able to access the memory 7, for example, for updating and/or supplementing the datasets stored on the database 10. Optionally, accessing the memory 7, and in particular the database 10 comprised therein, via the control unit 2 would also be possible by means of an operating panel 14 provided directly on the packaging machine 15.

Figure 2:
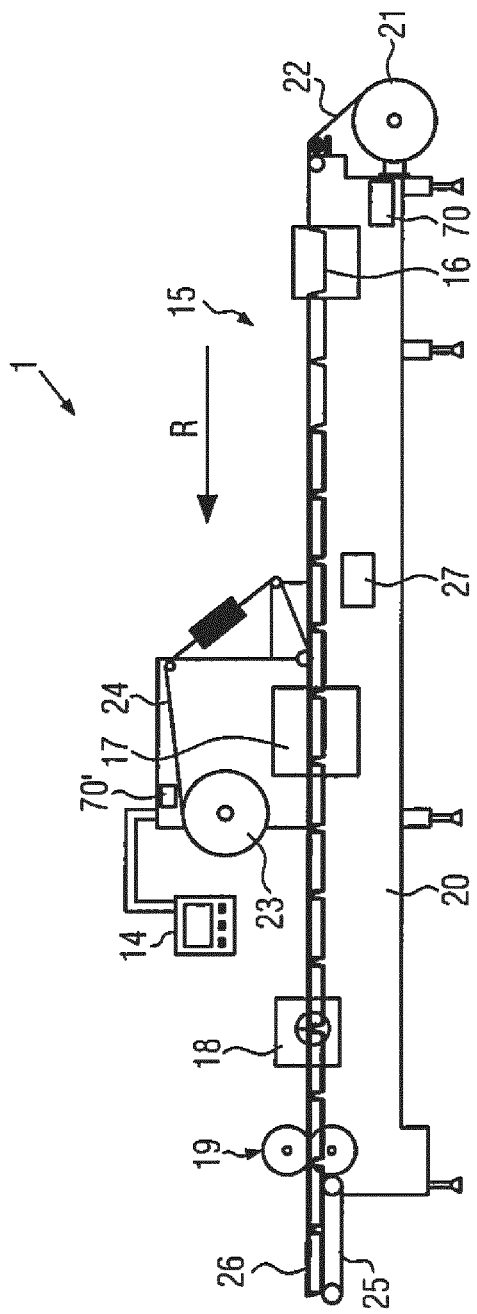
FIG. 2 is a schematic side view of an embodiment of a thermosetting packaging machine in accordance with the teachings of the present disclosure.

In FIG. 2, the packaging machine 1 according to the present invention is configured as a thermo-form packaging machine 15. The thermoform packaging machine 15 comprises a molding station 16, a sealing station 17, a cross cutting station 18 as well as a longitudinal cutting station 19, arranged on a machine frame 20 in this sequence in an working direction R. On the input side, the machine frame 20 has provided thereon a supply roll 21 from which a film web 22 is unwound. In the area of the sealing station 17, a material storage unit 23 is provided, from which a cover film 24 is withdrawn. On the output side, the thermoform packaging machine 15 has provided thereon a discharge unit 25 in the form of a conveyor belt with which finished, singulated packages 26 are transported away. Furthermore, the thermoform packaging machine 1 comprises a schematically shown film advancing unit 27, which grips the film web 22 and advances the same per main work cycle in the working direction R. The film advancing unit 27 is configured, for example, as a transport chain arranged on one or on both sides of the film web 22. Furthermore, FIG. 2 shows an RFID reader 70, 70' configured to detect information of an RFID tag, which is not shown and which is fixed to the bottom film/foil 22 and the cover film 24, respectively. The read information consists especially of film/foil specifications.

The principle according to the present invention, which has been described hereinbefore in connection with the general representation of the packaging machine 1 according to FIG. 1, can be applied to the thermoform packaging machine 15 according to FIG. 2. In the case of the thermoform packaging machine 15 according to FIG. 2, in particular the molding station 16 as well as the sealing station 17 can be taken into account as functionally controlled working units 3 of the type explained in connection with the packaging machine 1 according to FIG. 1, without limiting the working units 3 to these two components.

The molding station 16 is particularly suitable for a process control according to the present invention. This will be explained in more detail hereinafter making reference to various embodiments according to FIGS. 4a, 4b, 5a and 5b. Furthermore, it will be described hereinafter in connection with FIG. 6 how the inventive principle can be applied to the sealing station 17. The sealing station 17, considered individually, may comprise a plurality of working units 3, e.g. a sealing tool, a gas-flushing tool, an evacuating tool and/or a conveying means provided separately for the sealing station 17, which each run according to self-controlling program sequences individually and/or in coordination with respect to each other. A sealing station according to the present embodiment will be described hereinafter in connection with FIGS. 6a and 6b.

It follows that, according to the present invention, the processes carried out at the respective working units 3 in the thermoform packaging machine 15 will take place no longer primarily time-controlled, but in a self-controlled manner and process-oriented as a function of actual process values I which have been reached and measured at the respective working units 3.

Figure 3:
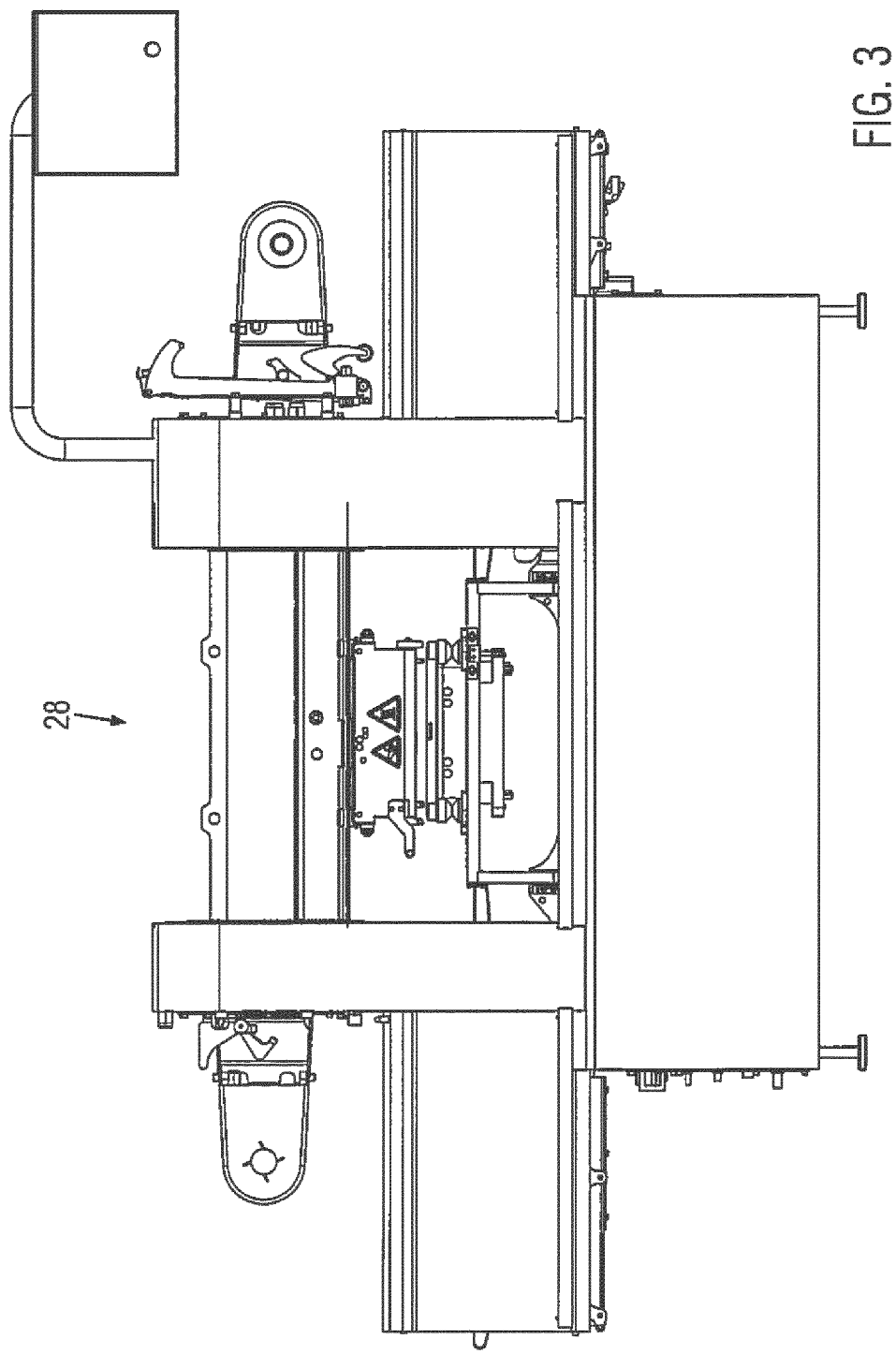
FIG. 3 is a side view of an embodiment of a tray sealer in accordance with the teachings of the present disclosure.
Figure 7A:
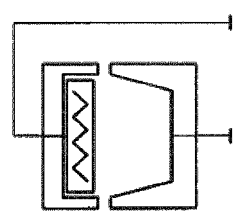
FIG. 7a is a section view of molding station in the prior art.

According to FIG. 3, the packaging machine 1 according to the present invention is configured as a tray sealer 28. The inventive principle of the self-controlled packaging machine 1 described above in connection with FIG. 1 can also be applied to the tray sealer 28.

Figure 4A:
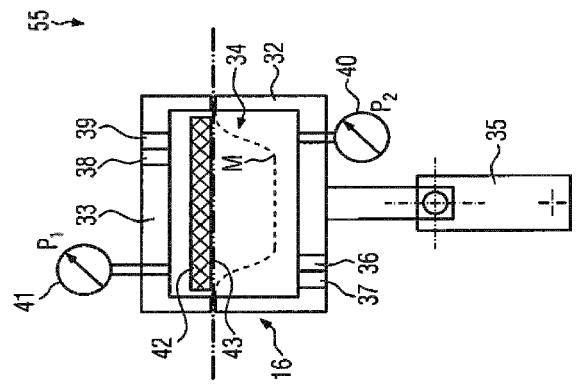
FIG. 4a is a sectional view of an embodiment of a molding station in accordance with the teachings of the present disclosure.
Figure 4B:
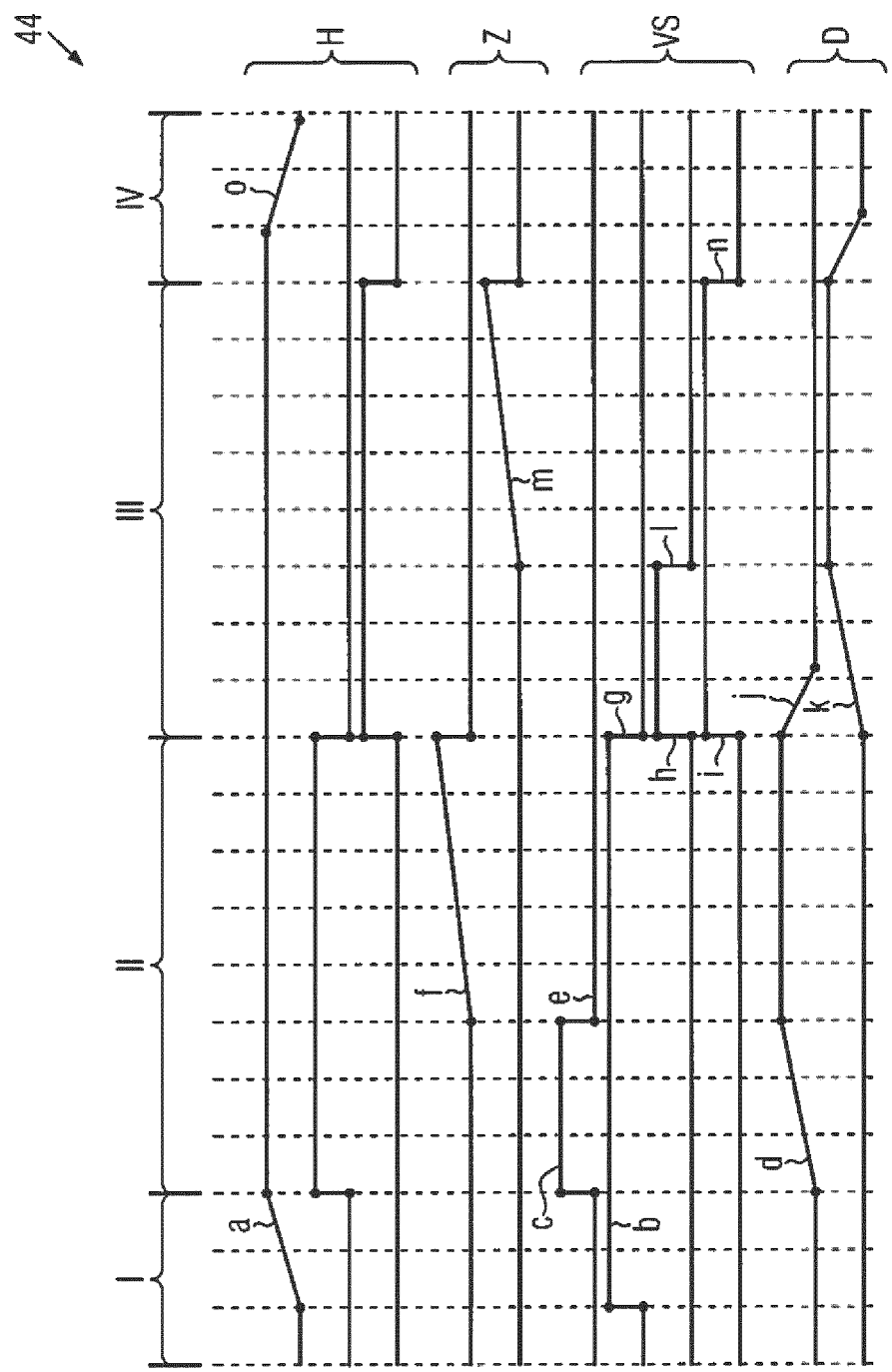

FIG. 4a shows the molding station 16 according to an embodiment variant. The process mode of the molding station 16 shown in FIG. 4a is shown in FIG. 4b.

The molding station 16 according to FIG. 4a comprises a lower part 32 and an upper part 33. Between the lower part 32 and the upper part 33, a molding chamber 34 is defined for forming packaging troughs M. The lower part 32 is connected to a lifting mechanism 35, which supports the lower part 32 such that it is vertically adjustable relative to the upper part 33. The lower part 32 has provided therein a lower pressure control valve 36 and a lower vent valve 37. The upper part 33 has provided therein an upper pressure control valve 38 and an upper vent valve 39.

FIG. 4a also shows that the lower part 32 has provided therein a lower pressure gauge 40 as a measuring device 5 and the upper part 33 has provided therein an upper pressure gauge 41. The lower and the upper pressure gauges 40, 41 are functionally connected to the control unit 2 of the packaging machine 1.

In addition, a heating plate 42 is arranged within the molding chamber 34 according to FIG. 4a. Below the heating plate 42 a film section 43 is positioned, which is clamped in position between the lower part 32 and the upper part 33. In the molding chamber 34, the film section 43 is first heated by means of the heating plate 42 and, subsequently, formed into a desired shape within the molding chamber 34 by generating a suitable pressure and/or vacuum, so as to produce the packaging troughs M. This will be described in more detail on the basis of FIG. 4b.

FIG. 4b shows a process diagram 44 for the process mode of the molding station 16 shown in FIG. 4a, said process mode being process-controlled in accordance with the present invention. The process diagram 44 shows, in a vertical arrangement, main processes H, process times Z, a valve control sequence VS and pressure profiles D, which take place in a process-controlled manner at the molding station 16 for producing packaging troughs M. As regards the horizontal arrangement, the process diagram 44 is temporally divided into process blocks I to IV.

In process block I, the molding station 16 encloses the film section 43 between the lower part 32 and the upper part 33. To this end, the lifting mechanism 35 displaces the lower part 32 relative to the upper part 33 from an open position to a closed position (step a). The lower vent valve 37 is moved to a closed position (step b).

In process block II, the molding station 16 is closed. Process block II comprises heating of the clamped film section 43 so that the latter can then be deformed more easily. In the lower part 32 a pressure is first generated, whereby the film section 43 is pressed against the heating plate 42 (step c). The increase in pressure in the lower part 32 is here monitored by means of the lower pressure gauge 40 (step d).

Furthermore, the pressure supply in the lower part 32 is interrupted in process block II (step e) and heating of the heating plate 42 according to a heating time is started (step f), when the pressure in the lower part 32 has reached a target value (target process value). The film section 43 is now in contact with the lower surface of the heating plate 42 without forming any creases thereon, and can be heated fast. The pressure level is here maintained in the lower part 32 during the heating time.

At the end of process block II and at the beginning of process block III, respectively, i.e. when the heating time has expired, the lower vent valve 37 will open (step g). In addition, the upper pressure control valve 38 opens (step h) and the upper vent valve 39 closes (step i). In process block III, the heated film section 43 is now formed. The film section 43 is here pressed into the lower part 32 and is thus formed into a packaging trough M.

In process block III, the increase in pressure generated in the upper part 33 is monitored (step k). While the pressure in the lower part 32 decreases (step j), the pressure in the upper part 33 increases up to a threshold value (target process value) (step k). When the threshold pressure in the upper part 33 is reached, pressure generation in the upper part 33 will be interrupted (step l) and a stabilization time (cooling time) will be started (step m). During the stabilization time, the pressure level in the upper part 33 is maintained, so that the packaging trough M produced will not lose shape. At the end of the stabilization time, the molding process according to process block III is finished. The packaging trough M is now hardened.

At the beginning of process block IV, the upper vent valve 39 opens (step n). This has the effect that the pressure level in the upper part 33 decreases. When the pressure level in the upper part 33 drops below a predetermined pressure threshold (target process value), the lifting mechanism 35 will open the molding station 16 (step o). The molded packaging trough M can now be transported out of the molding chamber 34 and, simultaneously, a new film section 43 to be molded will enter the molding station 16.

Depending on the type of film and/or type of tool used, the threshold pressure values referred to in process blocks II and III in the above-described example may vary. The control unit 2 is preferably configured for generating the respective threshold pressure values as target process values automatically from the memory 7, in particular by means of the database 10. In addition, the control unit is able to vary the heating time and the stabilization time (steps f and m) at least with respect to the film material and/or the types of tools.

Figure 5A:
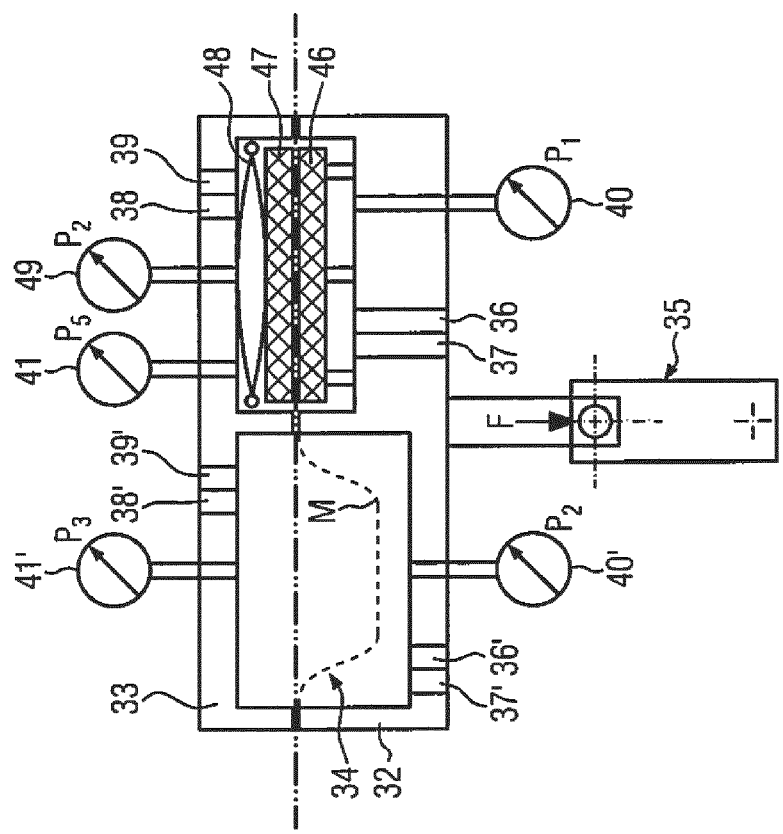
FIG. 5a is a section of another embodiment of a molding station in accordance with the teachings of the present disclosure.
Figure 5B:
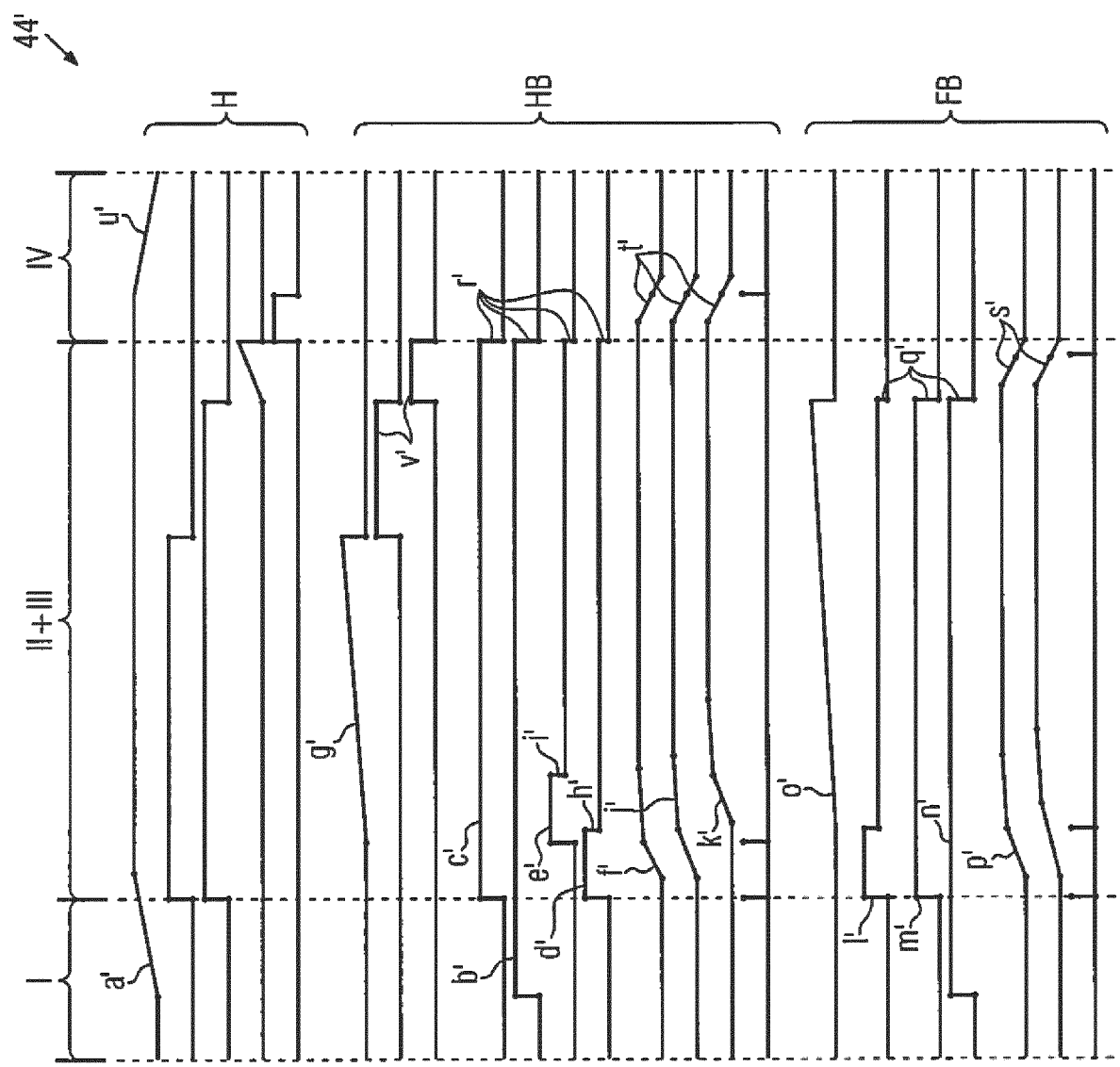

FIG. 5a shows the molding station 16 according to a different embodiment variant. The process mode of the molding station 16 shown in FIG. 5a is depicted in FIG. 5b.

The molding station 16 according to FIG. 5a comprises a separate heating chamber 45, which is operated as a preheating unit. When seen in the process direction, the heating chamber 45 is arranged upstream of the molding chamber 34. In the interior of the heating chamber 45, a lower and an upper heating plate 46, 47 are provided. The film section 43 to be heated is passed between these lower and upper heating plates. Above the upper heating plate 47, a pressure generator 48, in particular an inflatable membrane, is arranged, which, in the inflated condition, presses the upper heating plate 47 against the lower heating plate 46.

Furthermore, the heating chamber 45 and the molding chamber 34 are provided with respective lower and upper pressure control and vent valves 36, 36', 37, 37', 38, 38', 39, 39'. The applied pressures are measured in the heating chamber 45 and in the molding chamber 34 by means of respective lower and upper pressure gauges 40, 40', 41, 41'. A pressure applied in the interior of the pressure generator 48 is determined by means of a pressure generator gauge 49.

FIG. 5a shows that the heating chamber 45 and the molding chamber 34 can simultaneously be opened or closed, when the lower part 32 is displaced by means of the lifting mechanism 35. It would also be imaginable to configure the lower part 32 as a bipartite component, the respective parts of the lower part 32 being then displaceable separately from each other by means of lifting mechanisms 35 that are specially provided for this purpose.

FIG. 5b shows a process diagram for the molding station 16 depicted in FIG. 5a. In the double-chamber embodiment of the molding station 16, heating and molding take place parallel in time. Hence, the processes of process block II and process block III do not take place in temporal succession. For reasons of easier understandability, heating and molding will, however, be de-scribed separately from one another hereinafter.

The process diagram 44' shows, in a heating function block HB, working processes taking place in the heating chamber 45, and, in a molding function block FB, working processes taking place in the molding chamber 34.

To begin with, the molding station 16 is closed in process block I (step a'). The lifting mechanism 35 will here lift the lower part 32, whereby the heating chamber 45 and the molding chamber 34 will be closed. The heating function block HB shows that the lower vent valve 37 is closed (step b'). The heating function block HB also shows that the lower pressure control valve 36 generates a vacuum in the heating chamber 45 in the lower part 32 so as to pull the film section 43 onto the lower heating plate 46 (step c'). Likewise, pressure is applied in the upper part 33 of the heating chamber 45, said pressure being, however, optional. To this end, the upper pressure control valve 38 opens (step d'). Additionally, the pressure generator 48 presses against the upper heating plate 47, whereby the film section 43 is fixedly clamped between the lower and the upper heating plate 46, 47 (step e'). For precise pressure generation in the upper part 33 of the heating chamber 45, proportional control valves may in particular be used.

The heating function block HB also shows that a pressure reaction within the heating chamber 45 occurs with a time delay relative to the switching processes at the pressure control valves (steps c' and d') (dead time). This is taken into account in the control process of the molding station 16. On the basis of such a dead time control, the valve switching processes (steps c' and d') can already be triggered prematurely, e.g. 100 ms, when the molding station 16 is not yet at the closed position (cf. step a'). This is done, for example, by means of a distance metering unit for the lifting mechanism 35, said distance metering unit sending, from a certain closing stroke of the lifting mechanism 35 onwards, a signal to the control unit so that the latter will prematurely trigger the valves in question.

In the heating function block HB, the respective pressures in the heating chamber 45 are monitored at the beginning. As soon as a certain pressure level in the lower part 32 is detected by the pressure gauge 40 (step f'), the control unit 2 will initiate a heating process at the lower heating plate 46 (step g'). The pressures in the upper part 33 can be controlled in an arbitrary manner during the heating process. In particular, the pressures in the upper part 33 will be reduced to a predetermined pressure level, when a predetermined pressure has been reached within the upper part 33 and/or within the pressure generator 48 (steps h' and i').

In addition, it is shown that the vacuum in the lower part 32 and the pressure in the upper part 33 increase almost simultaneously (steps f' and j'). The pressure additionally applied by means of the pressure generator 48 increases with delay (step k'), only after the pressure level in the upper part 33 and/or the vacuum level in the lower part 32 have assumed a respective predetermined value.

In the molding function block FB, the lower and/or the upper pressure control valves 36', 38' and the lower and/or the upper pressure control valves 36, 38 of the heating chamber 45 are triggered prematurely, e.g. 100 ms before the molding station 16 is closed (steps l' and m'). The increase in pressure in the upper part 33 and/or the vacuum generation in the lower part 32 are monitored by the pressure gauges 40', 41'. The lower vent valve 37' remains closed during the molding process (step n').

From a certain pressure in the upper part 33 and/or vacuum in the lower part 32 onwards, the stabilization time starts running (step o'). The latter can especially also be triggered during the pressure and/or vacuum build-up (step p'). During the stabilization time, the molded packaging trough M will cool down and thus be rendered dimensionally stable.

FIG. 5b shows that the heating time in the heating chamber 45 is shorter than the stabilization time in the molding chamber 34. Nevertheless, the molding chamber 34 is vented earlier than the heating chamber 45 (steps q' and r'). Whereas the molding chamber 34 initiates venting immediately when the stabilization time expires (step q'), the respective valves 36, 37, 38, 39 of the heating chamber 45 will not be vented until the pressure and/or the vacuum in the molding chamber 34 has been reduced (step s'). With a certain delay in time, also the pressures in the heating chamber 45 will then be reduced (step t').

As soon as the pressure level in the molding chamber 34 and in the heating chamber 45 have jointly reached and/or fallen below a predetermined value, the lifting mechanism 35 will move downwards and open the molding station 16 (step u'). According to FIG. 5b, the molding chamber 34 could already have been opened at an earlier moment in time (step s'). Therefore, it would also be imaginable to use at the heating chamber 45 and at the molding chamber 34 lifting mechanisms 35 that work separately from each other. The idle times could be reduced in this way (step v'). Alternatively, the control unit 2 could temporally coordinate the venting of the respective valves at the heating chamber 45 and at the molding chamber 34 such that a predetermined pressure level for opening the molding station 16 will, in an optimum case, occur simultaneously within the heating chamber 45 and the molding chamber 34. In the case of FIG. 5b, venting of the heating chamber 45 (step r') may, for example, be initiated earlier for a closer temporal coordination of pressure reduction (steps t' and s').

FIG. 6a shows the sealing station 17 according to FIG. 2 in an enlarged representation. The process-controlled functional principle according to the present invention can also be applied to this sealing station 17.

According to a further variant, which is not shown in detail, a male die part is provided for the molding chamber 34. According to the prior art, the downward movement of the male die part was started and the molding process was started with a slight delay in a time-controlled manner. In the case of the variant according to the present invention, the movement of the male die part is started and also the molding process is started as soon as the male die part has reached a predetermined position.

In FIG. 6a, the sealing station 17 comprises a sealing lower part 64 and a sealing upper part 50. The sealing lower part 64 is vertically adjustable by means of a lifting mechanism 51. Between the sealing lower part 64 and the sealing upper part 50, a sealing chamber 52 is formed. In the sealing chamber, the cover film 24 is sealed onto the packaging trough M so as to enclose a (food) product therein. Above the cover film 24, a sealing plate 53 is positioned. Furthermore, a pressure generator 48, e.g. an inflatable membrane, is provided within the sealing upper part 50, said pressure generator 48 being adapted to be used for pressing down the sealing plate 53 so as to seal the cover film 24 in position on the packaging trough M.

The sealing lower part 64 comprises a lower valve unit 54 for generating a vacuum and for venting the sealing lower part 64. The sealing upper part 50 comprises an upper valve unit 55 for generating a vacuum and for venting the sealing upper part 50.

The sealing upper part 50 is provided with an upper pressure gauge 56. The pressure in the upper pressure generator 48 is measured by means of a pressure generator gauge 57. The sealing lower part 64 is provided with a lower pressure gauge 58. In addition, the sealing lower part 64 has formed therein a vacuum generator 59, which is able to generate a vacuum in the packaging trough M. The vacuum generated in the packaging trough M is measured by a vacuum gauge 60. For gas-flushing the packaging trough M with an arbitrary atmospheric gas, the sealing lower part 64 may have provided therein a gas-flushing unit 61.

Figure 6B:
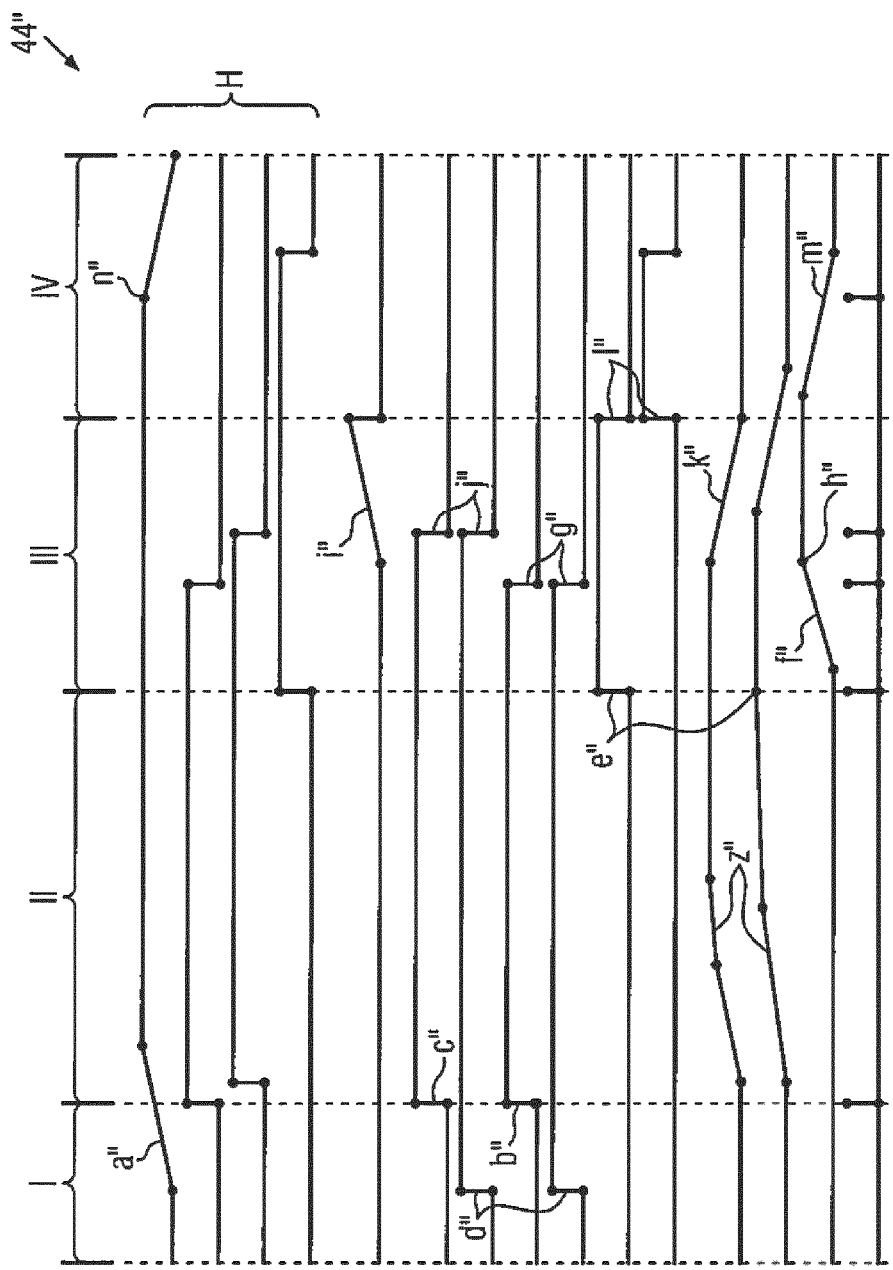
Figure 7B:
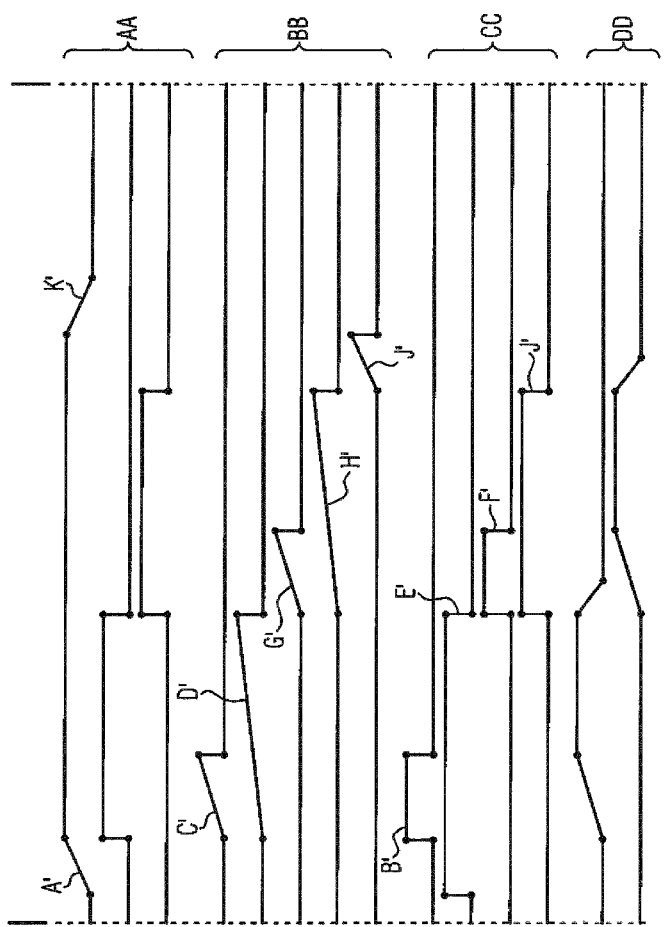

FIG. 6b shows the functional relationships at the sealing station 17 of FIG. 6a. The sealing process 44" takes place in a process-controlled manner according to the present invention.

In process block I of FIG. 6b, the sealing lower part 64 is first moved by means of the lifting mechanism 51 from an open position to a closed position, in which the sealing lower part 64, together with the sealing upper part 50, traps the packaging trough M and the cover film 24 positioned thereabove within the sealing chamber 52 (step a").

Before the sealing lower part 64 arrives at the closed position, the lower valve unit 54 is triggered for evacuating the sealing lower part 64 (step b"). With a short delay, but still before a closed position of the sealing lower part 64 is reached, the upper valve unit 55 is triggered for evacuating the sealing upper part 50 (step c"). The forerun in time for triggering the valve units 54 and 55 serves to eliminate dead times, which add up from the triggering up to the valve reaction and still further up to the actual pressure or vacuum build-up. These dead times can be determined by the control unit 2 in a test run.

In process block I, the valve units 54 and 55 for venting remain closed so as to build up a vacuum in the sealing lower part 64 as well as in the sealing upper part 50 (step d"). With a certain delay in time, a vacuum is built up in the sealing lower part 64 as well as in the sealing upper part 50 at the beginning of process block II. Due to the vacuum generated in the sealing lower part 64, the packaging trough M is first fixed. The vacuum in the sealing upper part 50 ensures that the cover film 24 is oriented above the packaging trough M without forming any creases.

In addition, the vacuum pressure profiles within the sealing lower part 64 and the sealing upper part 50 are monitored (step z"). In process block II, a vacuum is generated in the sealing lower part 64 and/or in the sealing upper part 50 until a predetermined vacuum value is detected in the sealing lower part 64 and/or in the sealing upper part 50 (step e").

According to a further variant, a moisture sensor, which is not shown in detail, is provided for detecting the degree of moisture in the vacuum for the product. It may happen that a predetermined final vacuum cannot be accomplished, since the product creates too much moisture. In this case, the control will detect this and finish this process step, although the final vacuum, viz. the predetermined vacuum value, has not yet been reached.

According to FIG. 6b, a predetermined vacuum pressure is finally reached in the sealing upper part 50 in process block II, said vacuum pressure initiating an inflation of the pressure generator 48, whereby the sealing plate 53 is pushed downwards and presses the cover film 24 onto the margin of the packaging trough M. In the course of this process, a contact pressure builds up in the sealing area (step f"). This mechanical contact pressure can be measured by means of at least one force sensor 62 (cf. FIG. 6a) provided in the sealing lower part 64 and/or in the lifting mechanism 51 connected to the latter. Alternatively, it is also possible to determine by means of a pressure sensor the pressure of a membrane which generates the sealing force.

Shortly afterwards, when the contact pressure is equal to a maximum sealing pressure (step h"), a sealing time is triggered (step I"), during which the cover film 24 is welded to the packaging trough M. The sealing time may be specified depending on the packaging materials used and/or on the type of sealing tool used.

During the sealing time, with a time delay relative to the venting of the sealing lower part 64, also the sealing upper part is vented (step j"). The triggering event for this may especially be that the vacuum in the sealing lower part 64 decreases to a specific vacuum value (step k").

Until the sealing time has expired in process block III, the sealing plate 53 remains pressed down. As soon as the sealing time has expired, the sealing plate 53 is lifted (step l"). To this end, the pressure is discharged from the pressure generator 48 and monitored (step m"), whereby the sealing plate 53 can be moved back to a starting position. As soon as the pressure in the pressure generator 48 reaches a predetermined value, the sealing station 17 can be opened in process block IV (step n"). Opening of the sealing station 17 can already be initiated when the sealing plate 53 has not yet fully reached its starting position, i.e. when the pressure in the pressure generator 48 has not yet been fully relieved. The vacuum in the sealing lower part 64 and in the sealing upper part 50 has already been fully eliminated by venting at this moment in time.

The present invention departs from a time-based control of the production process on a packaging machine. Time-controlled program sequences are no longer taken into account in the production process according to the present invention. On the contrary, the packaging machine according to the present invention intervenes in a self-controlled manner in the production process, based on process parameters detected at the moment in question, so as to coordinate in a self-controlled manner the respective program sequences P carried out at the working units 3 individually, and/or in coordination with one another. This leads to an economical production process, the packaging machine 1 according to the present invention being, in particular on the basis of a high degree of availability, suitable for producing a plurality of different products.

As a further embodiment it is imaginable that information and/or specifications of consumable materials, such as the film web 22 and the cover film 24, are automatically detected e.g. by means of RFID and processed by the control unit. The RFID readers 70 and 70' may here read an RFID tag attached to the film roll.

Molding or sealing tools may preferably be automatically detected in a wire-bound manner or a wireless manner by means of RFID, and identified and/or the information comprised thereon may be read and transferred to the control unit.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A packaging machine comprising:
    a control unit;
    a plurality of measuring devices and a plurality of working units for different processes, wherein the control unit is functionally connected to each of the plurality of working units and to each of the plurality of measuring devices;
    wherein each of the plurality of working units includes at least one of the plurality of measuring devices, wherein the respective at least one of the plurality of measuring devices detects one or more actual process values at the respective one of the plurality of working units and forwards the one or more actual process values to the control unit to monitor a process status of the one or more actual process values at each of the plurality of working units;

wherein the control unit creates a program sequence and operates the program sequence on its own during a package production process, wherein the program sequence is coordinated with respect to the plurality of working units by comparing the actual process values forwarded to the control unit from the plurality of measuring devices with associated target process values from a memory connected to the control unit, and wherein during the package production process, the control unit operates each of the plurality of working units according to the program sequence during the package production process depending on the actual process values detected at each of the plurality of working units such that the operation of each of the plurality of working units are coordinated with one another based upon the one or more actual process values.

2. The packaging machine according to claim 1, wherein the packaging machine is a thermoform packaging machine, a tray sealer or a belted chamber machine.

3. The packaging machine according to claim 1, wherein the memory comprises a database configured for deriving the target process values with respect to one of format-dependent, process-dependent, or film-dependent data of a product to be produced using the packaging machine, or one or more specific tool parameters.

4. The packaging machine according to claim 3, wherein the packaging machine comprises an RFID reader configured to read information from an RFID tag attached to a packaging film and to store this information on the database.

5. The packaging machine according to claim 3, wherein the database is configured as a component part of a database system, the database system additionally comprising a database management unit configured for a bidirectional exchange of data between the control unit and the database.

6. The packaging machine according to claim 1, wherein the associated target process values are based on one or more data points of the product to be produced, said one or more data points representing one of a sealing area, a sealing pressure, a volume to be evacuated, a type of film, or a film thickness.

7. The packaging machine according to claim 1, wherein the associated target process values indicate an optimum molding or sealing temperature, an optimum heating, sealing or molding pressure, or at least one stabilization time for one of the plurality of working units configured as a molding station.

8. The packaging machine according to claim 1, wherein the memory is configured such that it is integrated in the control unit or implemented as an external unit.

9. The packaging machine according to claim 1, wherein the memory is connectable to an external network, the memory being adapted to be one of updated or accessed via the external network.

10. The packaging machine according to claim 1, wherein the plurality of measuring devices comprise at least one of a force sensor, a pressure sensor, a distance sensor, a temperature sensor, an infrared sensor, an ultrasonic sensor, an induction sensor, a laser sensor and/or a moisture sensor.

11. The packaging machine according to claim 1, wherein each of the plurality of working units comprise a movable lower part and an upper part that enclose one of a molding chamber or a sealing chamber there between and at least one pressure gauge.

12. The packaging machine according to claim 1, wherein at least one of the plurality of working units is a molding station comprising at least one heating plate.

13. The packaging machine according to claim 12, wherein the molding station comprises a heating chamber and a molding chamber disposed in a position such that said heating chamber and said molding chamber are spaced apart.

14. The packaging machine according to claim 1, wherein at least one of the working units is a sealing station.

15. The packaging machine according to claim 1, wherein the one or more actual process value is a pressure detected in the one or more of the plurality of working units, and the control unit is configured for one of finishing or starting at least one working process at said working unit, or at least one other of said plurality of working units, when the pressure detected has reached a predetermined pressure level.

16. The packaging machine according to claim 15, wherein the at least one working process is one of a heating process or a cooling process that takes place according to one of a heating time or cooling time taken from the memory.

17. The packaging machine according to claim 1, wherein the one or more actual process values from each one of the plurality of working units measures a process progress of the respective one of the plurality of working units and the control unit adapts the program sequence during the package production process based upon one or more process progress detected at one or more of the plurality of working units.

* * * * *